(12) United States Patent
Inoue et al.

(10) Patent No.: US 7,915,524 B2
(45) Date of Patent: Mar. 29, 2011

(54) SEALING AGENT FOR PHOTOELECTRIC CONVERSION DEVICE AND PHOTOELECTRIC CONVERSION DEVICE USING THE SAME

(75) Inventors: Teruhisa Inoue, Tokyo (JP); Koichiro Shigaki, Tokyo (JP); Masaaki Ikeda, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 834 days.

(21) Appl. No.: 10/546,331

(22) PCT Filed: Feb. 18, 2004

(86) PCT No.: PCT/JP2004/001801
§ 371 (c)(1),
(2), (4) Date: Nov. 2, 2005

(87) PCT Pub. No.: WO2004/075333
PCT Pub. Date: Sep. 2, 2004

(65) Prior Publication Data
US 2006/0162771 A1 Jul. 27, 2006

(30) Foreign Application Priority Data
Feb. 20, 2003 (JP) .................................. 2003-042178

(51) Int. Cl.
*H01L 31/0216* (2006.01)
*C08F 2/46* (2006.01)
(52) U.S. Cl. ....................................... 136/263; 522/168
(58) Field of Classification Search .................. 136/243, 136/263; 522/168
See application file for complete search history.

(56) References Cited

U.S. PATENT DOCUMENTS
2001/0004901 A1 * 6/2001 Yamanaka et al. ............ 136/263
2003/0059618 A1   3/2003 Takai FOREIGN PATENT DOCUMENTS
| CN | 1320146 A | 10/2001 |
| EP | 0848294 A1 | 6/1998 |
| EP | 1138739 | 10/2001 |
| JP | 01-213304 | 8/1989 |

(Continued)

OTHER PUBLICATIONS

Supplementary European Search Report dated Aug. 3, 2010 for EP Application No. 04712226.2 ( same as PCT/JP2004/001801, "Sealing Agent for Photoelectric Conversion Element and Photoelectric Conversion Element Using the Same" ); PCT/JP2004/001801 is the parent of the instant application U.S. Appl. No. 10/546,331.

(Continued)

*Primary Examiner* — Kishor Mayekar
(74) *Attorney, Agent, or Firm* — McDermott Will & Emery LLP (57) ABSTRACT

A sealing agent for a photoelectric conversion device which comprises one or more of a compound having a glycidyl structure, a compound having a cyclohexene oxide structure, a compound having an oxetane structure and a compound having a vinyl ether structure, and a cationic polymerization initiator; a photoelectric conversion device using the sealing agent; and a solar cell comprising the photoelectric conversion device. The sealing agent for a photoelectric conversion device can be used for pasting together upper and lower electroconductive glass substrates at an ordinary temperature in the manufacture of a photoelectric conversion device, and is excellent with respect to adhesion strength and the reliability in moisture resistance.

15 Claims, 2 Drawing Sheets

FOREIGN PATENT DOCUMENTS

| | | |
|---|---|---|
| JP | 6-49365 A | 2/1994 |
| JP | 07-013175 | 1/1995 |
| JP | 09-005759 | 1/1997 |
| JP | 10-256580 A | 9/1998 |
| JP | 10-306248 A | 11/1998 |
| JP | 11-054768 | 2/1999 |
| JP | 2000-030767 | 1/2000 |
| JP | 2000-173680 A | 6/2000 |
| JP | 2000-186114 | 7/2000 |
| JP | 2000-204284 A | 7/2000 |
| JP | 2001-139933 | 5/2001 |
| JP | 2001-298208 A | 10/2001 |
| JP | 2002-313443 A | 10/2002 |
| JP | 2002-338659 | 11/2002 |
| JP | 2002-368233 A | 12/2002 |
| JP | 2002-368236 A | 12/2002 |
| JP | 2004-27073 A | 1/2004 |
| WO | 02/11213 | 2/2002 |

OTHER PUBLICATIONS

Japan Patent Office Notice (and English translation thereof) mailed Sep. 2, 2010 notifying of Third-Party Submission of an Observation regarding prosecution of Japanese Patent Application JP 2005-502738.

J.V. Crivello, Advances in Polymer Science 62, Springer-Verlag Berlin Heidelberg (1984), Cationic Polymerization-Iodonium and Sulfonium Salt Photoinitiators.

C. Barbe, F. Arendse, P. Comte et al., J. Am. Ceram. Soc., 80 (12), 3157-71 (1997), Nanocrystalline Titanium Oxide Electrodes for Photovoltaic Applications.

M.K. Nazeeruddin, A. Kay, I. Rodicio et al., J. Am. Chem. Soc. 115, 6382-6390 (1993), Conversion of Light to Electricity by cis-$X_2$Bis(2,2'-bipyridyl-4,4'-dicarboxylate)ruthenium(II) Charge-Transfer Sensitizers. . . .

W. Kubo, K. Murakoshi, T. Kitamura, Y. Wada, K. Hanabusa, H. Shirai, S. Yanagida, Chemistry Letters 1998, pp. 1241-1242, Fabrication of Quasi-Solid-State Dye-Sensitized $TiO_2$ Solar Cells Using Low Molecular Weight Gelators.

K. Tennakone, G.K.R. Senadeera, D.B.R.A. De Silva, I.R.M. Kottegoda, App. Phys. Ltrs., vol. 77 No. 15, Oct. 2000, Highly Stable Dye-Sensitized Solid-State Solar Cell With the Semiconductor $4CuBr\ 3S(C_4H_9)_2$ As the Hole Collector.

Shuji Hayase, "Pigment Enhancing Solar Battery and Gel Electrolytes", Mirai Zairyo (Future Materials), 3(1), 54-59 (2003), Japan. English-language Abstract provided.

Communication pursuant to Article 94(3) EPC mailed Nov. 4, 2010 for the corresponding European Application No. 04 712 226.2 (All of the cited references were previously submitted to the USPTO).

* cited by examiner

SEALING AGENT FOR PHOTOELECTRIC CONVERSION DEVICE AND PHOTOELECTRIC CONVERSION DEVICE USING THE SAME

CROSS-REFERENCE TO PRIOR APPLICATION

This is a U.S. national phase application under 35 U.S.C. §371 of International Patent Application No. PCT/JP2004/001801 filed Feb. 18, 2004, and claims the benefit of Japanese Patent Application No. 2003-42178 filed Feb. 20, 2003 which is incorporated by reference herein. The International Application was published in Japanese on Sep. 2, 2004 as WO 2004/075333 A1 under PCT Article 21(2).

TECHNICAL FIELD

The invention relates to a sealing agent, in particular to a sealing agent for a photoelectric conversion device, a photoelectric conversion device obtained by using the sealing agent and a production method of the photoelectric conversion device. The invention also relates to a solar cell using the photoelectric conversion device.

BACKGROUND ART

While solar cells that are noticed as a clean energy source have been used for home electricity in recent years, the spread of the solar cell energy in the home has remained insufficient. The reasons are rather insufficient performance of the solar cell itself that renders a module to be of large size, low productivity of the module, and high price of the solar cell as a result of the drawbacks above.

The solar cell module is assembled by protecting a photoelectric conversion device such as monocrystalline silicon, polycrystalline silicon, amorphous silicon, gallium-arsenic or copper-indium-selenium with an upper transparent protective material and lower substrate protective material, and the photoelectric conversion device and protective materials are fixed with a sealing agent to form a package. Accordingly, the sealing agent for the photoelectric conversion device of the solar cell is required to be excellent in a) moisture resistance, b) electrical insulation, c) heat resistance, d) moldability and workability, e) adhesive strength, f) purity, g) chemical resistance and h) gas-barrier property.

Today, an ethylene-vinyl acetate copolymer having a high content of vinyl acetate is used as the sealing agent for the photoelectric conversion device in the solar cell module from the viewpoint of flexibility and transparency (see Japanese Patent Application Laid-Open No. 11-54768). However, since heat resistance and adhesive property of the copolymer are not sufficient, an organic peroxide is required to be used together in order to complete the polymerization reaction. However, this required two production steps of forming a sheet of the ethylene-vinyl acetate copolymer containing such additives, and sealing the photoelectric conversion device using the sheet obtained. In the sheet production step of this process, extrusion molding speed cannot be increased since the sheet should be molded at a low temperature so that the organic peroxide is not decomposed. On the other hand, the sealing step of the photoelectric conversion device requires two time-consuming adhesion steps comprising a step for temporarily adhering in a laminator in several minutes to more than ten minutes, and a step for finally adhering in an oven in several tens of minutes to 1 hour at a temperature high enough for decomposing the organic peroxide. Although production of the solar cell module requires much labor and time as described above, adhesive property and reliability on moisture resistance remain not so improved.

Heat resistance is not sufficient when the copolymer or an ionomer having a low melting point is used (Japanese Patent Application Laid-Open No. 2000-186114). Such resins are not preferable since the module may be deformed by a temperature increase during the use of the photoelectric conversion device, or excess sealing agent may flow out when the solar cell module is produced by thermal compression bonding to form flashes. The stress applied on the seal portion in the production process has been remarkably increased in accordance with an increased size of photocells in recent years.

The sealing agent is required to be more reliable in moisture resistance corresponding to the increased length of seal lines. In addition, the sealing agent is also required to be able to equalize the thickness between conductive substrates used for the photoelectric conversion device from the view point of narrowing the seal lines, while the sealing agent is required to be excellent in adhesiveness and flexibility.

In 1991, a photo (solar) cell using a photoelectric conversion device named as a dye-sensitized solar cell was developed by Graetzel (Switzerland). This solar cell, which is also called as a Graetzel cell, comprises a charge transfer layer (an electrolyte solution containing a redox substance) interposed between a thin film substrate, which comprises oxide semiconductor particles that is sensitized with a dye and serves as one electrode on a transparent conductive substrate, and a substrate, facing the transparent conductive substrate, that serves as a counter-electrode on which a reducing agent such as platinum is disposed.

For sealing an electrolyte solution between both electrodes of the dye-sensitized solar cell, square columns made of a glass, metal or plastic as sealing solids are bonded with an epoxy resin or a silicone resin between the electrodes (see Japanese Patent Application Laid-Open No. 2000-173680). However, work process becomes complicated in such composite sealing process. Moreover, water vapor permeability is large when a silicone resin is used for sealing, and this method is not suitable for long term sealing of a liquid such as the electrolyte solution in the dye-sensitized solar cell.

Use of a polyisobutene resin as a sealing agent of the electrolyte solution for the dye-sensitized solar cell is also reported (Japanese Patent Application Laid-Open No. 2002-313443) According to this report, a thermosetting resin is used in primary sealing for bonding both electrodes, and a UV-curable resin is used in secondary sealing for blocking an injection port after injecting an electrolyte solution through the port. However, the resin cannot be sufficiently hardened since the sealing agent contacts the redox charge transfer layer. While water vapor permeability of this resin is quite low as compared with a silicone resin, its ductility is so large that changes of its property against temperature changes are too large. Adhesive strength of the resin at a low temperature is low with additional drawbacks of poor workability, poor abrasion resistance and slow elastic recovery to render the solar cell to have poor durability for long term uses.

As hitherto described, the sealing agents that have been proposed cannot satisfy all the performances required as a sealing agent for the photoelectric conversion device, particularly for the photoelectric conversion device for the dye-sensitized solar cell. In particular, the conventional sealing agent has no performance for sealing the redox charge transfer layer.

DISCLOSURE OF INVENTION

The major object of the invention is to provide a sealing agent for a photoelectric conversion device that is able to bond upper and lower conductive substrates at an ambient temperature in the production process of a solar cell with excellent adhesive strength and reliable moisture resistance, and a production method of the photoelectric conversion device using the sealing agent. The inventors of the invention have found, through intensive studies for solving the problems as described above, that a highly reliable photoelectric conversion device could be obtained by using a sealing agent having a specified composition. The sealing agent is seldom contaminated with the electrolyte solution, is excellent in workability, and promptly hardened with an active energy beam such as UV light or by heating at low temperatures with good properties of the cured resin such as adhesive strength, reliable moisture resistance and gas barrier property. The invention has been completed through the studies as described above.

Accordingly, the invention provides:

(1) a sealing agent for a photoelectric conversion device comprising one or more compounds selected from the group consisting of a compound having a glycidyl structure, a compound having a cyclohexene oxide structure, a compound having an oxetane structure and a compound having a vinyl ether structure and a cationic polymerization initiator;

(2) a sealing agent for a photoelectric conversion device comprising at least two compounds selected from a compound having a glycidyl structure, a compound having a cyclohexene oxide structure, a compound having an oxetane structure and a compound having a vinyl ether structures and a cationic polymerization initiator;

(3) the sealing agent for a photoelectric conversion device according to (1) to (3), wherein the compound having a glycidyl structure is a bisphenol type epoxy resin;

(4) the sealing agent for a photoelectric conversion device according to (3), wherein the bisphenol type epoxy resin is a bisphenol A type epoxy resin;

(5) the sealing agent for a photoelectric conversion device according to any one of (1) to (4) further containing a thermoplastic elastomer in the sealing agent for the photoelectric conversion device;

(6) the sealing agent for a photoelectric conversion device according to (5), wherein the content of the thermoplastic elastomer is less than 20% by weight;

(7) the sealing agent for a photoelectric conversion device according to any one of (1) to (6) further containing a coupling agent in the sealing agent for the photoelectric conversion device;

(8) the sealing agent for a photoelectric conversion device according to (7), wherein the coupling agent is a silane coupling agent;

(9) the sealing agent for a photoelectric conversion device according to any one of (1) to (8) further containing an inorganic filler in the sealing agent for the photoelectric conversion device;

(10) the sealing agent for a photoelectric conversion device according to (9), wherein the inorganic filler is alumina and/or silica;

(11) the sealing agent for a photoelectric conversion device according to any one of (1) to (10), wherein the cationic polymerization initiator is a diaryliodinium salt and/or a triarylsulfonium salt;

(12) a photoelectric conversion device sealed with the sealing agent for the photoelectric conversion device according to any one of (1) to (11);

(13) a dye-sensitized photoelectric conversion device sealed with the sealing agent for the photoelectric conversion device according to any one of (1) to (11);

(14) a solar cell comprising the photoelectric conversion device according to (12) or the dye-sensitized photoelectric conversion device according to (13);

(15) a production method of a photoelectric conversion device comprising the steps of: disposing a conducive substrate having a semiconductor-containing layer and a conductive substrate having a counter-electrode to face to one another at a specified distance; fixing the substrates with a sealing agent for a photoelectric conversion device interposed at the periphery of the substrates; and inserting a charge transfer layer in a gap between the substrates to obtain a photoelectric conversion device, wherein the sealing agent according to any one of (1) to (11) is used as the sealing agent; and (16) a production method of a photoelectric conversion device comprising the steps of: disposing a conductive substrate having a semiconductor-containing layer and a conductive substrate having a counter-electrode to face to one another at a specified distance; fixing the periphery of the substrates with the sealing agent for the photoelectric conversion device of the invention except an injection port for injecting a charge transfer layer; injecting the charge transfer layer through the injection port; and sealing the injection port with the sealing agent for the photoelectric conversion device of the invention.

BRIEF DESCRIPTION OF THE DRAWINGS

FIG. 1 shows a cross sectional illustration of the main part of the dye-sensitized solar cell using the photoelectric conversion device prepared by using the sealing agent according to the invention. The reference numeral 1 denotes a conductive substrate inside of which is conductive, the reference numeral 2 denotes a dye-sensitized semiconductor-containing layer, and the substrate 1 and semiconductor-containing layer 2 are collectively named as a semiconductor electrode. The reference numeral 3 denotes a counter-electrode comprising platinum and the like disposed on a conductive face at the inside of a conductive substrate, the reference numeral 4 denotes a charge transfer layer disposed so as to interpose between the conductive substrates facing to one another, and reference numeral 5 denotes a sealing agent.

BEST MODE FOR CARRYING OUT THE INVENTION

The invention will be described in detail hereinafter.

The photoelectric conversion device according to the invention comprises a pair of transparent conductive substrates such as conductive glasses disposed to face to one another with a given distance apart, and a sealing agent for allowing a charge transfer layer to interpose between the paired conductive substrates, wherein a compound having a glycidyl structure such as a bisphenol type epoxy resin and an alicyclic epoxy resin, a compound having a cyclohexene oxide structure such as an alicyclic epoxy resin, a compound having an oxetane structure and a compound having a vinyl ether structure, and a cationic polymerization initiator are used as the sealing agent, in which a thermoplastic elastomer, a coupling agent and an inorganic filler, as well as a photosensitizer, an adhesive force enhancing agent, a spacer (space controlling material), an ion trapping agent and other additives, if necessary, are mixed and uniformly dispersed. The viscosity of the sealing agent is preferably adjusted in order to improve workability depending on the method for applying the sealing agent (described below). The range of the viscosity is, for example, 10,000 to several hundreds of thousands mPa·s, preferably 20,000 to 100,000 mPa·s at 25° C. as measured by an E-type viscometer. The viscosity may be adjusted by changing the molecular weight or blend ratio of the resin used, or by using a viscosity controlling agent or a solvent.

Each resin or compound constituting the sealing agent of the invention is preferably of high purity, and commercially available resins may be used after purification if required. The method of purification is not particularly limited and includes conventionally used methods such as washing with water, distillation, recrystallization, treatment with activated carbon and column chromatography. Such a purification facilitates obtaining a highly reliable sealing agent for the photoelectric conversion device. The sealing agent of the invention is compatible with a usually used sealing method comprising the steps of applying the sealing agent on a conductive substrate by a dispense method or printing method, bonding both substrates, and hardening the sealing agent by irradiating an active energy beam.

Hardening of the sealing agent of the invention proceeds by light irradiation or heating. While the sealing agent can be hardened by irradiation of an active energy beam such as UV light to an extent sufficient for practical uses, it is preferable to further subject the sealing agent to a heat treatment at a relatively low temperature of 50 to 120° C. for several minutes to 1 hour in order to ensure sufficient reliability.

Specific examples of the compound having the glycidyl structure include bisphenol type epoxy resins such as bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, hydrogenated bisphenol A diglycidyl ether, hydrogenated bisphenol F diglycidyl ether, hydrogenated bisphenol S diglycidyl ether, and hydrogenated bisphenol AD diglycidyl ether; epoxy novolac resins; glycidyl ethers such as 1,4-butanediol diglycidyl ether, 1,6-hexanediol diglycidyl ether, glycerin triglycidyl ether, trimethylolpropane triglycidyl ether, polyethyleneglycol diglycidyl ether and polypropyleneglycol diglycidyl ether; polyglycidyl ethers of polyether polyols obtained by addition of one or more alkylene oxides to an aliphatic polyfunctional alcohol such as ethyleneglycol, propyleneglycol and glycerin; glycidyl ethers of aliphatic higher alcohols; glycidyl ethers of cyclic ethers such as 1,3-dioxane and 1,4-dioxane; monoglycidyl ethers of phenol, cresol and butylphenol or polyether alcohols obtained by addition of an alkylene oxide thereto; glycidyl esters of higher fatty acids such as epoxidized soybean oil, butyl epoxystearate, octyl epoxystearate, epoxidized linseed oil and epoxidized polybutadiene; and phenol novolac epoxy compounds. Bisphenol type epoxy resins are preferable examples.

Examples of the bisphenol type epoxy resin include usually produced and commercially available epoxy resins such as bisphenol A epoxy resin, bisphenol F epoxy resin, bisphenol S epoxy resin, N,N-diglycidyl-o-touidine, N,N-diglycidyl aniline, phenyl glycidyl ether, resorcinol diglycidyl ether, 1,6-hexanediol diglycidyl ether, trimethylolpropane triglycidyl ether, polypropyleneglycol diglycidyl ether, (3,4-3',4'-epoxycyclo)hexylmethylhexane carboxylate, and hexahydrophthalic anhydride diglycidyl ester. Examples of commercially available bisphenol A epoxy resin include Epikote 828, Epikote 10001, Epikote 1004, Epikote 1007, Epikote 1009 and Epikote 1010; examples of commercially available bisphenol Fepoxy resin include Epikote 4001, Epikote 4004 and Epikote 4007 (trade names, manufactured by Yuka Shell Epoxy Co., Ltd.), YDF-8170, YDF-170, YDF-175S, YDF-2001 and YDF-2004 (trade names, manufactured by Tohto Kasei Co.), RE-310S and RE-410S (trade names, manufactured by Nippon Kayaku Co.), Epomic R301 (trade name, manufactured by Mitsui Petrochemical Co.), and Epicron 850S (trade name, manufactured by Dainippon Ink & Chemicals, Inc.); and examples of commercially available bisphenol F epoxy resins include RE-304S and RE-404S (trade names, manufactured by Nippon Kayaku Co.), Epikote 807 (manufactured by Japan Epoxy Resins Co., Ltd.), and Adeka Resin EP4900 (trade name, manufactured by Asahi Denka Co.). While the epoxy resins are not limited to those as described above, bisphenol A epoxy resin is preferable among them. It is further preferable to use high purity bisphenol type epoxy resins.

Specific examples of phenol novolac epoxy compounds include ECN-1273, Araldite ECN-1280 and Araldite ECN-1299 (trade names, manufactured by Asahi Ciba Co.), YDCN-701, YDCN-702, YDCN-703, YDCN-704 and YDCN-500 (trade names, manufactured by Tohto Kasei Co.). However, the epoxy resins are not particularly limited so long as they are compounds having a glycidyl structure known in the art, and may be selectively used depending on the desired viscosity of the sealing agent. These resins may be used alone, or at least two of them may be used together.

While the bisphenol type epoxy resin available may have an epoxy equivalent of about 180 to 3,000 g/eq, it is more preferably about 180 to 900 g/eq. The total amount of chlorine contained in the epoxy resin used in the invention is preferably 1,500 ppm or less, more preferably 1,200 ppm or less, and further preferably 1,000 ppm or less. Corrosion of the ITO electrode of the photocell may be evident when the total content of chlorine is 1,500 ppm or more. The epoxy equivalent is measured by the method according to JIS K7236, and the total content of chlorine is measured by a hydrolysis method (the same hereinafter). The bisphenol type epoxy resin is not limited to one kind of the resin, and two or more bisphenol epoxy resins having different epoxy equivalent and molecular weight may be used together for controlling the viscosity and workability.

A compound having a cyclohexene oxide structure may be favorably used in the invention. Examples of the compound having the cyclohexene oxide structure include 3,4-epoxycyclohexylmethyl-3',4'-epoxycyclohexane carboxylate, 2-(3,4-epoxycyclohexyl-5,5-spiro-3,4-epoxy)cyclohexene-meta-dioxane, bis(3,4-eoxycyclohexylmehtyl)adipate, bis(3,4-epoxy-6-methylcyclohexylmethyl)adipate, vinylcyclohexane oxide, 4-vinylepoxycyclohexane, 3,4-epoxy-6-methylcyclohexyl-3',4'-epoxy-6'-methyl cyclohexane carboxylate, methylenebis(3,4-epoxycyclohexane), dicyclopentadiene diepoxide, di(3,4-epoxycyclohexylmethyl)ether of ethyleneglycol, ethylenebis(3,4-epoxycyclohexane carboxylate), lactone-modified 3,4-epoxycyclohexylmethyl-3',4'-epoxycyclohexane carboxylate, epoxidized tetrabenzyl alcohol, lactone-modified epoxidized tetrahydrobenzyl alcohol, and cyclohexane oxide. Examples of the commercially available compound having the cyclohexene oxide structure include UVR-6100, UVR-6105, UVR-6110, UVR-6128 and UVR-6200 (trade names, manufactured by Union Carbide Co.); Celoxide 2021, Celoxide 2021P, Celoxide 2081, Celoxide 2083, Celoxide 2085, Celoxide 2000, Celoxide 3000, Cyclomer A200, Cyclomer M100, Cyclomer M101, Epolead GT-301, Epolead GT-302, Epolead G01, Epolead 401, Epolead 403, Epolead HD300 and ETHB (trade names, manufactured by Daicel Chemical Industries, Ltd.); and KMR-2110 and KMR-2199 (trade names, manufactured by Asahi Kasei Co.). The compounds are not particularly limited so long as they have a cyclohexene oxide structure known in the art. The compound may be selected depending on the desired viscosity of the sealing agent. One compound may be selected for use, or two or more of the compounds may be used together.

The compound having the oxetane structure is also preferably used in the invention. Examples of the compound having the oxetane structure include trimethylene oxide, 3,3-dimethyl oxetane, 3,3-dichloromethyl oxetane, 3-ethyl-3-methoxymethyl oxetane, 3-ethyl-3-butoxymethyl oxetane, 3-ethyl-3-hexyloxymethyl oxetane, 3-ethyl-3-hydroxymethyl oxetane, 3-methyl-3-hydroxymethyl oxetane, 3-ethyl-3-allyloxymethyl oxetane, 3-ethyl-3-(2'-hydroxyethyl)oxymethyl oxetane, 3-ethyl-3-(2'-hydroxy-3'-phenoxypropyl)oxymethyl oxetane, 3-ethyl-3-(2'-hydroxy-3'-butoxypropyl)oxymethyl oxetane, 3-ethyl-3-(2'-butoxyethyl)oxymethyl oxetane, 3-ethyl-3-benzyloxymethyl oxetane, 3-ethyl-3-(p-tert-butylbenzyloxymethyl)oxetane, 3-ethyl-3-methacryloyloxymethyl oxetane, 3-ethyl-3-acryloyloxymethyl oxetane, 3-ethyl-3-phenoxymethyl oxetane, bis(3-ethyl-3-methyloxy)butane, 3-chloromethyl-3-methyl oxetane, 3-chloromethyl-3-ethyl oxetane, 3-bromomethyl-3-methyl oxetane, 3-bromomethyl-3-ethyl oxetane, 3-iodomethyl-3-methyl oxetane, 3-iodomethyl-3-ethyl oxetane, 3-hydroxymethyl-3-ethyl oxetane, and 1-hydroxy-6-(3-ethyl-3-oxetanylmethoxy)hexyl.

Examples of the commercially available compound having the oxetane structure include biphenyl dioxetane (BPDO, manufactured by Ube Industries, Ltd.) and xylylene dioxetane (XDO, trade name OXT-121, manufactured by To a Gosei Co.). The compound is not particularly limited so long as all or a part of oxirane rings of the compound having the glycidyl structure known in the art are substituted with the oxetane ring. The compound may be selectively used depending on the desired viscosity of the sealing agent. One of the compounds may be used alone, or two or more of them may be used together.

The compound having the vinyl ether structure may be also favorably used in the invention. Examples of the compound having the vinyl ether structure include vinyl ether compounds and propenyl ether compounds.

Examples of the vinyl ether compound include ethyl vinyl ether, propyl vinyl ether, isobutyl vinyl ether, octadecyl vinyl ether, butyl vinyl ether, ethyleneglycol monovinyl ether, butanediol monovinyl ether, ethyleneglycol butylvinyl ether, triethyleneglycol methyl vinyl ether, cyclohexanedimethanol monovinyl ether, cyclohexanedimethanol divinyl ether, 2-ethylhexyl vinyl ether, t-butyl vinyl ether, t-amyl vinyl ether, hydroxyethyl vinyl ether, hydroxybutyl vinyl ether, cyclohexyl vinyl ether, butanediol divinyl ether, ethyleneglycol divinyl ether, diethyleneglycol divinyl ether, triethyleneglycol divinyl ether, 1,3-butenediol divinyl ether, neopentylglycol divinyl ether, trimethylolpropane trivinyl ether, hexanediol divinyl ether, 1,4-cyclohexanediol divinyl ether, tetraethyleneglycol divinyl ether, pentaerythritol divinyl ether, pentaerythritol trivinyl ether, pentaerythritol tetravinyl ether, sorbitol tetravinyl ether, sorbitol pentavinyl ether, dipentaerythritol hexavinyl ether, ethyleneglycol diethoxyvinyl ether, triethyleneglycol diethoxyvinyl ether, ethyleneglycol dipropylenevinyl ether, trimethylolpropane triethoxyvinyl ether, pentaerythritol tetraethoxyvinyl ether, dipentaerythritol pentaethoxyvinyl ether, dipentaerythritol hexaethoxyvinyl ether, 2-hydroxyethyl vinyl ether, 2-hydroxypropyl vinyl ether, 4-hydroxybutyl vinyl ether, pentaerythritol trivinyl ether, 2-ethylhexyl vinyl ether, chloromethyl vinyl ether and 2-chloroethyl vinyl ether.

Examples of the propenyl ether compound include ethyl propenyl ether, propyl propenyl ether, isobutyl propenyl ether, octadecyl propenyl ether, butyl propenyl ether, ethyleneglycol monopropenyl ether, butanediol monopropenyl ether, ethyleneglycol butyl propenyl ether, triethyleneglycol methyl propenyl ether, cyclohexanedimethanol monopropenyl ether, cyclohexanedimethanol dipropenyl ether, t-butyl propenyl ether, t-amyl propenyl ether, hydroxyethyl propenyl ether, hydroxybutyl propenyl ether, cyclohexyl propenyl ether, butanediol dipropenyl ether, ethyleneglycol dipropenyl ether, diethyleneglycol dipropenyl ether, triethyleneglycol dipropenyl ether, 1,3-butenediol dipropenyl ether, neopentylglycol dipropenyl ether, trimethylolpropane tripropenyl ether, hexanediol dipropenyl ether, 1,4-cyclohexanediol dipropenyl ether, tetraethyleneglycol dipropenyl ether, pentaerythritol dipropenyl ether, pentaerythritol tripropenyl ether, pentaerythritol tetrapropenyl ether, sorbitol tetrapropenyl ether, sorbitol pentapropenyl ether, dipentaerythritol pentapropenyl ether, dipentaerythritol hexapropenyl ether, ethyleneglycol diethoxypropenyl ether, triethyleneglycol diethoxypropenyl ether, ethyleneglycol dipropylene propenyl ether, trimethylolpropane triethoxypropenyl ether, pentaerythritol tetraethoxypropenyl ether, dipentaerythritol panta and hexaethoxypropenyl ether, tricyclodecane dimethylol propenyl ether, 2-hydroxyethyl propenyl ether, and 4-hydroxybutyl propenyl ether. The compounds are not particularly limited so long as they have the vinyl ether structure known in the art. The compound may be selectively used depending on the desired viscosity. The compounds may be used alone, or two or more of them may be used together. In a preferred embodiment, the compound having the glycidyl structure, the compound having the cyclohexene oxide structure and the compound having the oxetane structure may be mixed for use in the invention.

Each of the compound having the glycidyl structure, the compound having cyclohexene oxide structure, the compound having the oxetane structure and the compound having the vinyl ether structure may be used alone, or may be used by mixing two or more of them. When two or more of these compounds are mixed, the mixture may contain at least one of the compound having the glycidyl structure, the compound having cyclohexene oxide structure the compound having the oxetane structure and the compound having the vinyl ether structure, and the partner of combination may be either one of the compounds of the invention or a compound other than the compounds of the invention. The mixing ratio differs depending on the desired property of the sealing agent. These compounds may be purified by an activated carbon treatment, alumina column treatment or washing with water after dissolving them in a solvent such as toluene. It is essential to avoid the solvent from being left behind in the resin or compound by sufficient drying to completely eliminate solvent and moisture after purification. The purification methods are not limited to those as described above, and molecular distillation may also be employed.

The total content of any one of or a mixture of two or more of the compounds having the glycidyl structure, having the cyclohexene oxide structure, having the oxetane structure and having the vinyl ether structure is usually 5 to 95% by weight, preferably 10 to 90% by weight.

Since the viscosity of the resin of the sealing agent for the photoelectric conversion device is lowered by allowing the sealing agent for the photoelectric conversion device of the invention to contain one compound or two or more compounds selected from the group consisting of the compounds having the glycidyl structure, having the cyclohexene oxide structure, having the oxetane structure and having the vinyl ether structure when the upper and lower conductive substrates are bonded in the production process of the photoelectric conversion device, the substrates can be bonded at an ambient temperature and a gap between the substrates can be readily formed.

The sealing agent of the invention is compatible with a usual bonding method, wherein the sealing agent is applied on one of the conductive substrates by a dispense method or printing method, both electrodes are bonded together, and the sealing agent is hardened by irradiating an active energy beam. The sealing agent of the invention is also compatible with any of the following two procedures: the upper and lower conductive substrates are fixed with the sealing agent of the invention except a portion that serves as an injection port (primary sealing), and the injection port is sealed with the sealing agent of the invention after injecting the charge transfer layer (secondary sealing); or the upper and lower conductive substrates are fixed with a sealing agent other than the sealing agent of the invention except a portion that serves as an injection port (primary sealing), and the injection port is sealed with the sealing agent of the invention after injecting the charge transfer layer (secondary sealing).

While the cationic polymerization initiator used in the invention is not particularly limited so long as the initiator is able to efficiently generate cations by a heat treatment or by irradiating an active energy beam, and conventional cationic polymerization initiators may be used, aromatic onium salts are favorably used. Examples of the aromatic onium salt comprise anionic components such as $F^-$, $Cl^-$, $Br^-$, $I^-$, $SbF_6^-$, $SbF_4^-$, $BF_4^-$, $AsF_6^-$, $PF_6^-$, $BC_6F_5^-$, $BC_6H_2(CF_3)_2^-$, $N(SO_2CF_3)_2^-$ and $N(CN)_2^-$, and aromatic cations containing iodine, sulfur, nitrogen or phosphorous atoms. A diaryliodonium salt and triarylsulfonium salt are particularly preferable among them. General examples of the salts include the compounds represented by the formulae (1) to (5) below, or those having the same skeletons as the skeletons in these compounds. The diaryliodonium salts represented by the formulae (1) and (2) are particularly preferable among them. While one of these cationic initiators may be used alone or two or more of them may be used together, the compound having a high purity is preferably used. The compound is preferably purified before use when its purity is low.

The content of the cationic polymerization initiator is usually 0.01 to 20% by weight, preferably 0.1 to 10% by weight, and more preferably 1 to 7% by weight, in the sealing agent.

The sealing agent for the photoelectric conversion device of the invention may contain optional components such as a thermoplastic elastomer, a coupling agent, an inorganic filler, a photosensitizer and other additives in addition to the compounds having the glycidyl structure, having the cyclohexene oxide structure, having the oxetane structure and having the vinyl ether structure, and the cationic polymerization initiator.

A SBS block copolymer comprising hydrogenated butadiene blocks (such as Toughtec M series, manufactured by Asahi Kasei Co.) may be preferably used as an example of the thermoplastic elastomer that may be contained, if necessary, in the invention. The thermoplastic elastomer that is blended in the epoxy resin in advance (for example trade name X-4801, manufactured by Asahi Kasei Co.) may be used. Impact resistance and adhesive strength can be improved by blending such thermoplastic elastomer. The content of the thermoplastic elastomer is preferably less than 20% by weight in the sealing agent. Excess addition of the thermoplastic elastomer is not preferable since the viscosity becomes too high.

Examples of the coupling agent added, if necessary, in the invention include silane coupling agents such as 3-glycidoxypropyl trimethoxysilane, 3-glycidoxypropylmethyl dimethoxysilane, 3-glycidoxypropylmethyl dimethoxysilane, 2-(3,4-epoxycyclohexyl)ethyl trimethoxysilane, N-phenyl-γ-aminopropyl trimethoxysilane, N-(2-aminoethyl)-3-aminopropylmethyl dimethoxysilane, N-(2-aminoethyl)-3-aminopropylmethyl trimethoxysilane, 3-aminopropyl triethoxysilane, 3-mercaptopropyl trimethoxysilane, vinyl trimethoxysilane, N-(2-(vinylbenzylamino)ethyl)-3-aminopropyl trimethoxysilane hydrochloride, 3-methacryloxypropyl trimethoxysilane, 3-chloropropylmethyl dimethoxysilane, 3-chloropropyl trimethoxysilane; titanium coupling agents such as isopropyl(N-ethylaminoethylamino)titanate, isopropyl triisostearoyl titanate, titanium di(dioctylpyrophosphate)oxyacetate, tetraisopropyl di(dioctylphosphite)titanate, and neoalkoxy tri(p-N-(β-aminoethyl)aminophenyl) titanate; and zirconium or aluminum coupling agents such as Zr-acetylacetonate, Zr-methacrylate, Zr-propionate, neoalkoxy zirconate, neoalkoxy tris(neodecanoyl) zirconate, neoalkoxy tris(dodecanoyl) benzenesulfonyl zirconate, neoalkoxy tris(ethylenediaminoethyl)zirconate, neoalkoxy tris(m-aminophenyl)zirconate, ammonium zirconium carbonate, Al-acetylacetonate, Al-methacrylate, and Al-propionate. Silicone coupling agents are preferable, and specific examples of the preferably used silicone coupling agent include epoxysilane coupling agents (such as A-186 and A-187 manufactured by Nippon Unicar Co.), and glycidyl ethoxysilane and glycidyl methoxysilane (3-glycidoxypropyl trimethoxysilane (KBM 403) manufactured by Shin-Etsu Chemical Co.). A sealing agent for the photoelectric conversion device obtained by using the silane coupling agent as described above is excellent in reliability in moisture resistance without substantial decrease in adhesive strength by moisture absorption, and has good adhesivity to the conductive glass. The content of the silane coupling agent is preferably about 5% by weight in the sealing agent.

Inorganic fillers used in the invention, if necessary, are not particularly limited and include those used in electronic materials such as a sealing agent. Examples of them include fused silica, crystalline silica, silicon carbide, silicon nitride, boron nitride, calcium carbonate, magnesium carbonate, barium sulfate, calcium sulfate, mica, talc, clay, alumina, titania, magnesium oxide, zirconium oxide, aluminum hydroxide, magnesium hydroxide, calcium silicate, aluminum silicate, lithium aluminum silicate, zirconium silicate, barium titanate, glass fiber, carbon fiber, molybdenum disulfide and asbestos. Fused silica, crystalline silica, silicon nitride, boron nitride, calcium carbonate, barium sulfate, calcium sulfate, mica, talc, clay, alumina, aluminum hydroxide, calcium silicate and aluminum silicate are preferable among them. Fused silica, crystalline silica and alumina are more preferable.

While the shape of the inorganic filler is not particularly limited including crushed or spherical fine powders, the inorganic filler is desired to be as pure as possible. When the purity is low, the inorganic filler is purified by repeatedly washing with pure water. It is preferable to perfectly remove moisture by drying with heating. Two or more of the inorganic fillers may be mixed, and silica and alumina are preferably used together.

The maximum particle diameter of the inorganic filler used in the invention, if necessary, is 10 µm or less, preferably 6 µm or less and more preferably 4 µm or less. In particular, the maximum diameter is 4 µm or less and average particle diameter is 2 µm or less. A gap may not be successfully formed after bonding the upper and lower conductive substrates in the production process of the photoconductive conversion device, when the maximum diameter of the inorganic filler is larger than 10 µm. The inorganic filler having the preferable maximum diameter is produced, for example, by classifying crushed fused silica or crystalline silica. Alumina is produced, for example, by firing aluminum hydroxide, flame hydrolysis of anhydrous aluminum chloride, or firing ammonium alum, followed by crushing and classification.

The content of the inorganic filler used in the invention, if necessary, is preferably less than 30% by weight, more preferably less than 20% by weight, in the sealing agent for the photoelectric conversion device. When the content of the inorganic filler is larger than 60% by weight, a gap for the photocell can be hardly formed since the sealing agent is difficult to deform (elongate) because the content of the inorganic filler is too large.

Other additives such as a photosensitizer, viscosity controlling agent, adhesive force enhancing agent, ion trapping agent and pigment may be blended, if desired, in the sealing agent according to the invention in addition to the components as described above.

While the photosensitizer reported by Crivllo (Adv. in Polymer Sci., 62, 1 (1984)) is an example, the photosensitizer is not limited thereto. Any photosensitizer having a photosensitizing action may be used, or two or more of such photosensitizers may be used together. Specific examples of the photosensitizer available include thioxanthone, anthracene and pyrene.

Examples of the viscosity controlling agent include a modified oligomer of butadiene-acrylonitrile copolymer, novolac type epoxy resin and diallylphthalate resin (for example, Daiso Dap, manufactured by Daiso Co.). Acrylic core-shell fine particles (F351, manufactured by Nippon Zeon Co.) are an example of the adhesive force enhancing agent.

The sealing agent for the photoelectric conversion device of the invention can be readily obtained by mixing at least one of a bisphenol type epoxy resin, the compounds having the glycidyl structure, having the cyclohexene oxide structure, having the oxetane structure and having the vinyl ether structure, and a cationic polymerization initiator, and other additives, if necessary, such as a thermoplastic elastomer, a coupling agent, an inorganic filler, an adhesive force enhancing agent, an ion trapping agent, a photosensitizer and others, and by homogeneously dispersing the mixture. The viscosity of the sealing agent is preferably adjusted in order to improve workability depending on the mode of application of the sealing agent. The viscosity is, for example, usually in the range of several tens of thousands to several millions mPa·s, preferably in the range of several tens of thousands to several hundreds of thousands mPa·s, as measured by an E-viscometer at a temperature of 25° C. The viscosity may be controlled by changing the molecular weight and the amount of blending of the resin used, or by using the viscosity controlling agent or a solvent.

An example of the ion trapping agent is DHT-6 (trade name, manufactured by Kyowa Chemical Industry Co.), and titanium black is an example of the pigment.

The content of the additives as described above is selected to be in the range of 0.1 to 5% by weight in the sealing agent.

The sealing agent of the invention is preferably used as a uniform composition, in which each component is thoroughly mixed followed by kneading with a three-roll mill for permitting the composition to be more homogeneous. The sealing agent is favorably filtered for removing aggregates remaining in the composition.

A spacer is preferably added for ensuring a desired thickness of the cell when the sealing agent for the photoelectric conversion device of the invention is used. Examples of the spacer include glass fibers and glass beads. While the diameter of the spacer varies depending on the object, it is usually 2 to 30 µm, preferably 4 to 20 µm. The spacer is used in an amount of 0.1 to 4 parts by weight, preferably 0.5 to 2 parts by weight, and more preferably 0.9 to 1.5 parts by weight, relative to 100 parts by weight of the sealing agent for the photoelectric conversion device of the invention.

A solvent may be added for improving workability when the sealing agent for the photoelectric conversion device of the invention is used. Examples of the solvent available include alcohol solvents, ether solvents, acetate solvents and water. The solvent may be used alone, or as a mixture of two or more solvents in an arbitrary ratio.

Examples of the alcohol solvent include alkyl alcohols such as ethanol and isopropyl alcohol; alkoxy alcohols such as 3-methyl-3-methoxybutanol, 3-methyl-3-ethoxybutanol, 3-methyl-3-n-propoxybutanol, 3-methyl-3-isopropoxybutanol, 3-methyl-3-n-butoxybutanol, 3-methyl-3-isobutoxybutanol, 3-methyl-3-sec-butoxybutanol, and 3-methyl-3-tert-butoxybutanol; and terpineol.

Examples of ether solvents include monohydric alcohol ether solvents, alkyleneglycol monoalkyl ether solvents, alkyleneglycol dialkyl ether solvents, dialkyleneglycol alkyl ether solvents and trialkyleneglycol alkyl ether solvents.

Examples of the monohydric alcohol ether solvent include 3-methyl-3-methoxybutanol methyl ether, 3-methyl-3- ethoxybutanol ethyl ether, 3-methyl-3-n-butoxybutanol ethyl ether, 3-methyl-3-isobutoxybutanol propyl ether, 3-methyl-3-sec-butoxybutanol isopropyl ether, and 3-methyl-3-tert-butoxybutanol n-butyl ether.

Examples of the alkyleneglycol monoalkyl ether include propyleneglycol monomethyl ether, propyleneglycol monoethyl ether, propyleneglycol monopropyl ether, propyleneglycol monoisopropyl ether, propyleneglycol mono-n-butyl ether, propyleneglycol monoisobutyl ether, propyleneglycol mono-sec-butyl ether, propyleneglycol mono-tert-butyl ether, ethyleneglycol monomethyl ether, ethyleneglycol monoethyl ether, ethyleneglycol monopropyl ether, ethyleneglycol monoisopropyl ether, ethyleneglycol mono-n-butyl ether, ethyleneglycol monoisobutyl ether, ethyleneglycol mono-sec-butyl ether, and ethyleneglycol mono-tert-butyl ether.

Examples of the alkyleneglycol dialkyl ether solvents include propyleneglycol dimethyl ether, propyleneglycol diethyl ether, propyleneglycol dipropyl ether, propyleneglycol diisopropyl ether, propyleneglycol di-n-butyl ether, propyleneglycol diisobutyl ether, propyleneglycol di-sec-butyl ether, propyleneglycol di-tert-butyl ether, ethyleneglycol dimethyl ether, ethyleneglycol diethyl ether, ethyleneglycol dipropyl ether, ethyleneglycol diisopropyl ether, ethyleneglycol di-n-butyl ether, ethyleneglycol di-isobutyl ether, ethyleneglycol di-sec-butyl ether, and ethyleneglycol di-tert-butyl ether.

Examples of the dialkyleneglycol alkyl ether solvents include dipropyleneglycol methyl ether, dipropyleneglycol ethyl ether, dipropyleneglycol dipropyl ether, dipropyleneglycol diisopropyl ether, dipropyleneglycol di-n-butyl ether, dipropyleneglycol diisobutyl ether, dipropyleneglycol di-sec-butyl ether, dipropyleneglycol di-tert-butyl ether, diethyleneglycol dimethyl ether (diglyme), diethyleneglycol diethyl ether, diethyleneglycol dipropyl ether, diethyleneglycol diisopropyl ether, diethyleneglycol di-n-butyl ether, diethyleneglycol diisobutyl ether, diethyleneglycol di-sec-butyl ether, and diethyleneglycol di-tert-butyl ether.

Examples of the trialkyleneglycol alkyl ether solvents include alkyleneglycol dialkyl ether such as tripropyleneglycol dimethyl ether, tripropyleneglycol diethyl ether, tridipropyleneglycol dipropyl ether, tripropyleneglycol diisopropyl ether, tripropyleneglycol di-n-butyl ether, tripropyleneglycol diisobutyl ether, tripropyleneglycol di-sec-butyl ether, tripropyleneglycol di-tert-butyl ether, triethyleneglycol dimethyl ether, triethyleneglycol diethyl ether, triethyleneglycol dipropyl ether, triethyleneglycol diisopropyl ether, triethyleneglycol di-n-butyl ether, triethyleneglycol diisobutyl ether, triethyleneglycol di-sec-butyl ether, and triethyleneglycol di-tert-butyl ether.

Examples of the acetate solvents include alkyleneglycol monoalkyl ether acetate such as ethyleneglycol monomethyl ether acetate, ethyleneglycol monoethyl ether acetate, ethyleneglycol monopropyl ether acetate, ethyleneglycol monoisopropyl ether acetate, ethyleneglycol mono-n-butyl ether acetate, ethyleneglycol mono-sec-butyl ether acetate, ethyleneglycol monoisobutyl ether acetate, ethyleneglycol mono-tert-butyl ether acetate, propyleneglycol monomethyl ether acetate, propyleneglycol monoethyl ether acetate, propyleneglycol monoisopropyl ether acetate, propyleneglycol monopropyl ether acetate, propyleneglycol mono-n-butyl ether acetate, propyleneglycol nono-sec-butyl ether acetate, propyleneglycol monoiobutyl ether acetate, propyleneglycol mono-tert-butyl ether acetate, 3-methyl-3-methoxybutyl acetate, 3-methyl-3-ethoxybutyl acetate, 3-methyl-3-propoxybutyl acetate, 3-methyl-3-isopropoxybutyl acetate, 3-methyl-3-n-butoxyethyl acetate, 3-methyl-3-isobutoxybutyl acetate, 3-methyl-3-sec-butoxybutyl acetate and 3-methyl-3-tert-buroxybutyl acetate; and solvents such as ethyleneglycol diacetate, diethyleneglycol diacetate, triethyleneglycol diacetate, propyleneglycol diacetate, dipropyleneglycol diacetate, tripropyleneglycol diacetate, diethyleneglycol monobutyl ether acetate, and butyl acetate.

The solvent may be used in an arbitrary quantity necessary for adjusting the viscosity of the sealing agent for the photoelectric conversion device so as to be applied with a dispenser or by screen printing, for example to 200 to 1,000 poise at 25° C. Accordingly, the solvent is used, if necessary, in a quantity of less than 50% by weight, preferably less than 30% by weight, relative to 100 parts by weight of the sealing agent for the photoelectric conversion device.

The photoelectric conversion device of the invention may be readily obtained by the steps comprising: applying the sealing agent of the invention on a conductive surface of the glass substrate by a dispense method or a printing method; allowing a pair of the conductive glass substrates to face to one another; irradiating an active energy beam such as a UV light to the facing glass substrates with compression; and hardening the sealing agent of the invention. The temperature for thermosetting is 50 to 200° C. with a heating time of several minutes to several hours. While the active energy beam is not particularly limited and includes a UV light, X-ray and electron beam, the UV light is preferably used since a cheap irradiation apparatus is available for industrial uses. While the light sources of the UV light include a pressurized mercury lamp, a high vapor pressure mercury lamp, a metal halide lamp and a xenon lamp, various light sources may be used without being limited to those described above. The irradiated luminous energy is usually 1 to 10,000 $mJ/cm^2$, preferably 1,000 to 6,000 $mJ/cm^2$, and more preferably 2,000 to 4,000 $mJ/cm^2$.

While the sealing agent of the invention is able to exhibit its performance such as sufficient adhesive strength by itself, it is favorable to subject it to thermosetting after irradiating the active energy beam in order to improve long term reliability. A relatively low heating temperature of 50 to 120° C. is sufficient with a heating time of several minutes to one hour. Since the cationic polymerization initiator permits hardening of the resin to proceed by a dark reaction after stopping an external energy to be supplied and after the initial reaction, the sealing agent may be hardened by taking advantage of such property as described above.

The photoelectric conversion device to which the sealing agent of the invention is applied generally includes all the devices that are able to convert a light energy to an electric energy. A photocell is formed by connecting lead wires so as to guide an electric current generated from the photoelectric conversion device to form a closed circuit.

While the sealing agent of the invention is able to use in various photoelectric conversion devices, it is particularly suitable for a dye-sensitized solar cell. The dye-sensitized solar cell comprises a semiconductor electrode and a counter-electrode, each of which comprises a conductive substrate, and a charge transfer layer.

The conductive substrate is composed of a conductive substance represented by FTO (fluorine-doped tin oxide), ATO (antimony-doped tin oxide) and ITO (indium-doped tin oxide), which is formed into a thin film on a substrate such as a glass, plastic or polymer film. Conductivity of the conductive substrate is usually 1,000 $\Omega/cm^2$ or less, preferably 100 $\Omega/cm^2$ or less.

The semiconductor electrode is obtained by disposing a semiconductor-containing layer, which is sensitized by retaining a pigment, on the surface of the conductive substrate such as the FTO glass.

The semiconductor of the semiconductor-containing layer is preferably fine particles of metal chalcogenide, and specific examples thereof include transition metal oxides such as oxides of Ti, Zn, Sn, Nb, W, In, Zr, Y, La and Ta, oxides of Al and Si, and perovskite-type oxide such as $StTiO_3$, $CaTiO_3$ and $BaTiO_3$. $TiO_2$, $ZnO$ and $SnO_2$ are particularly preferable among them. These oxides may be used as a mixture, and a mixed system of $SnO_2$—$ZnO$ is particularly preferable. The primary particle diameter is usually 1 to 200 nm, preferably 1 to 50 nm.

The mixed system may be prepared by mixing respective particles, by mixing as a slurry or paste as will be described below, or may be overlaid to one another.

The semiconductor-containing layer can be prepared by directly forming a thin layer of an oxide semiconductor on the substrate by vacuum deposition, by electrically depositing a thin film using the substrate as an electrode, and by applying or coating a slurry or paste on the substrate followed by drying and hardening or firing. The slurry method is preferable considering the performance of the oxide semiconductor electrode. The slurry is obtained by dispersing the fine particles of the oxide semiconductor as a secondary aggregate in a dispersion medium using a dispersing agent so that the average primary particle diameter is 1 to 200 nm, or by hydrolyzing an alkoxide as a precursor of the oxide semiconductor by a sol-gel method (see C. J. Barbe, F. Arendse, P. Compt and M. Graetzel, J. Am. Ceram. Soc., 80, 12, 3157-71 (1997)).

The specific surface area of the fine particles of the oxide semiconductor obtained as above is usually 1 to 1,000 $m^2/g$, preferably 10 to 500 $m^2/g$. Fine particles of the oxide semiconductors having different particle diameters may be mixed for use. Any dispersion medium may be used for dispersing the slurry so long as the medium is able to disperse the semiconductor fine particles, and usually water, and organic solvents such as alcohols such as ethanol, ketones such as acetone and acetylacetone, and hydrocarbons such as hexane may be used. These solvents may be used as a mixture. Water is preferably used for reducing viscosity changes of the slurry.

A dispersion stabilizer may be added, if necessary, to the slurry for obtaining stable primary fine particles. Examples of the dispersion stabilizer include polyhydric alcohols such as polyethyleneglycol; alcohol condensates with phenol or octyl alcohol; cellulose derivatives such as hydroxypropylmethyl cellulose, hydroxymethyl cellulose, hydroxyethyl cellulose and carboxymethyl cellulose; polyacrylamide; poly (meth) acrylic acid and salts thereof; copolymers of poly(meth) acrylic acid and salts thereof with acrylamide and (meth) acrylic acid or alkali metal salts thereof; or water-soluble polyacrylate derivatives as copolymers of (A) acrylamide and/or alkali metal salts of (meth)acrylic acid, and (B) (meth) acrylic acid ester such as methyl (meth)acrylate and ethyl (meth)acrylate or hydrophobic monomers such as styrene, ethylene and propylene; salts of melamine sulfonic acid—formaldehyde condensate; salts of naphthalene sulfonic acid—formaldehyde condensate; salts of high molecular weight lignin sulfonic acid; acids such as hydrochloric acid, nitric acid and acetic acid. However, the dispersion stabilizer is not limited to those as described above. Any one of these dispersion stabilizers may be used alone, or two or more of these dispersion stabilizers may be used together.

Among these dispersion stabilizers, polyhydric alcohols such as polyethyleneglycol, condensation products with phenol or octyl alcohol, and those having carboxylic groups and/or sulfonic groups and/or amide groups are preferable. Poly(meth)acrylic acid and salts thereof such as poly(meth) acrylic acid, sodium poly(meth)acrylate, potassium poly (meth)acrylate and lithium poly(meth)acrylate, carboxymethyl cellulose, and acids such as hydrochloric acid, nitric acid and acetic acid are also preferable.

The concentration of the oxide semiconductor in the slurry is 1 to 90% by weight, preferably 5 to 80% by weight.

The temperature for firing the substrate on which the slurry is applied is generally below the melting point (softening point) of the substrate, usually 100 to 900° C. (melting point or softening point), preferably 100 to 600° C. (melting point or softening point) While the firing time is not particularly limited, it is preferably within about 4 hours.

The semiconductor-containing layer may be subjected to a secondary treatment for improving surface smoothness (see C. J. Barbe, F. Arendse, P. Compt and M. Graetzel, J. Am. Ceram. Soc., 80, 12, 3157-71 (1997)). The desired smoothness may be attained by dipping the entire substrate on which the layer is formed in a solution of an alkoxide, chloride, nitrate or sulfide of the same metal as the metal of the semiconductor, followed by drying or re-firing. Examples of the metal alkoxide available include titanium ethoxide, titanium isopropoxide, titanium t-butoxide and n-dibutyl diacetyl tin, and an alcoholic solution thereof is used. Examples of the chloride include titanium tetrachloride, tin tetrachloride and zinc chloride, and an aqueous solution thereof is used.

Light energy can be absorbed and converted into an electric energy by allowing a sensitizing dye to be adsorbed on the semiconductor-containing layer. The sensitizing dye is a metal complex dye containing a metal device such as ruthenium or an organic dye not containing a metal, or a mixture thereof, and is not particularly limited so long as it is able to sensitize light absorption.

Then the method for allowing the semiconductor-containing layer to retain the dye is described.

An example for allowing the semiconductor-containing layer to retain the dye is to immerse the substrate on which the semiconductor-containing layer is formed in a solution obtained by dissolving the dye in a solvent capable of dissolving the dye, or in a dispersion solution in which the dye is dispersed when the solubility of the dye is low. The concentration of the dye in the solution or dispersion solution may be appropriately determined depending on the respective dye. The substrate on which the semiconductor-containing layer is formed is immersed in the solution. The immersing temperature is generally from ambient temperature to a boiling point of the solvent, and the immersion time is from 1 hour to 48 hours. Specific examples of the solvent for dissolving the dye include methanol, ethanol, acetonitrile, dimethylsulfoxide, dimethylformamide and 1-butanol. The concentration of the dye in the solution is usually $1\times10^{-6}$ M to 1 M, preferably $1\times10^{-5}$ M to $1\times10^{-1}$ M. The semiconductor electrode is thus obtained by disposing the semiconductor-containing layer sensitized with the dye as described above.

One kind of the dye may be retained on the semiconductor-containing layer, or a plurality of the dyes may be mixed together. Organic dyes may be mixed, or an organic dye may be mixed with a metal complex dye. A wide absorption wavelength region may be utilized by mixing dyes having different absorption wavelengths to one another to enable a solar cell having a high conversion efficiency to be obtained. While the metal complex dye that can be retained is not particularly limited, phthalocyanine and porphyrin reported by M. K. Nazeeruddin, A. Kay and M. Graetzel (J. Am. Chem. Soc., 115, 6382-6390 (1993)) and Shuji Hayase (Mirai Zairyo (Future Materials), 13(1), 54-59 (2003)) are preferable, while organic dyes that can be retained include non-metallic phthalocyanine and porphyrin as well as cyanine, merocyanine, oxonol and triphenylmethane dyes, methine dyes such as acrylic acid dyes reported in WO 2002/011213, and xanthene dyes, azo dyes, anthraquinone dyes and perylene dyes. Ruthenium complexes and merocyanine, and methine dyes such as acrylic dyes as described above are preferable. The proportion of each dye is not particularly limited when the dyes are used by mixing, and an optimum condition is selected for each dye. However, it is generally preferable that the dyes are mixed in an equimolar amount, or the content of any one of the dye is increased by about 10 mol % or more. When the dyes are adsorbed on the semiconductor-containing layer using a solution containing two or more dissolved or dispersed dyes, the total concentration of the dyes in the solution may be the same as the concentration of a dye when only one dye is retained. The solvents as described above can be used for mixing the dyes, and the solvents for respective dyes may be the same or different.

It is effective to retain the dyes in the presence of a clathrate compound for preventing the dyes from associating to one another, when the dyes are retained on the semiconductor-containing layer. While examples of the clathrate compounds include steroid compounds such as cholic acid, crown ethers, cyclodextrin, calixarene and polyethylene oxide, cholic acids such as cholic acid, deoxycholic acid, chenodeoxycholic acid, methyl cholate and sodium cholate, and polyethylene oxide are preferable. The surface of the semiconductor electrode may be treated with an amine such as 4-t-butylpyridine after allowing the dye to be retained. For treating with the amine, the substrate having the semiconductor-containing layer on which the dye is retained is immersed in an ethanol solution of the amine.

The solar cell of the invention is usually composed of the semiconductor electrode comprising a dye retained on the oxide semiconductor-containing layer, a counter-electrode and a charge transfer layer. A solution containing a redox electrolyte or a positive hole transfer material dissolved in a solvent or a fused salt at an ambient temperature (ionic liquid) is used as the charge transfer layer.

While examples of the redox electrolyte used in the solar cell of the invention include: halogen redox electrolytes comprising a halogen compound having halogen ions as counter-ions and halogen molecules; metal redox electrolytes of metal complexes such as ferrocyanate-ferricyanate, ferrocene-ferricinium ions and cobalt complexes; and organic redox electrolytes such as alkylthiol-alkyldisulfide, viologen dyes and hydroquinone-quinone, the halogen redox electrolytes are preferable. While iodine molecules and bromine molecules are examples of the halogen molecules in the halogen redox electrolyte comprising the halogen compound-halogen molecule, iodine molecule is preferable. While examples of the halogen compound comprising halogen ions as counter-ions include halogenated metal salts such as LiI, NaI, KI, CsI, $CaI_2$ and CuI, and organic quaternary ammonium salts of halogens such as tetraalkylammonium iodide, imidazolium iodide, 1-methyl-3-alkylimidazolium iodide and pyridinium iodide, salts comprising iodide ions as counter-ions are preferable. Examples of the salts comprising the iodine ion as the counter-ion include lithium iodide, sodium iodide and trimethylammonium iodide.

When the charge transfer layer is composed of a solution containing the redox electrolyte, an electrically inert solvent is used for the solvent. Examples of the solvent available include acetonitrile, propylene carbonate, ethylene carbonate, 3-methoxypropionitrile, methoxyacetonitrile, ethyleneglycol, propyleneglycol, diethyleneglycol, triethyleneglycol, dimethoxyethane, diethyl carbonate, diethyl ether, dimethyl carbonate, 1,2-dimethoxyethane, dimethylformamide, dimethylsulfoxide, 1,3-dioxolane, methyl formate, 2-methyl tetrahydrofuran, 3-methoxyoxaziridine-2-one, γ-butylolactone, sulfolane, tetrahydrofuran and water, acetonitrile, propylene carbonate, ethylene carbonate, 3-methoxypropionitrile, methoxyacetonitrile, ethyleneglycol, 3-methoxyoxaziridine-2-one and γ-butylolactone are particularly preferable. These solvents may be used alone, or as a combination of two or more of them. The concentration of the redox electrolyte is usually 0.01 to 99% by weight, preferably 0.1 to 90% by weight.

When the charge transfer layer contains a redox electrolyte, a fused liquid (ionic liquid) at an ambient temperature is used as a solvent. Examples of the fused liquid at the ambient temperature include 1-methyl-3-alkylimidazolium iodide, vinylimidazolium tetrafluoride, 1-ethylimidazole sulfonate, alkylimidazolium trifluoromethylsulfonyl imide and 1-methylpyrrolidinium iodide. The viscosity may be increased by dissolving a low molecular weight gelling agent in the charge transfer layer for improving durability of the photoelectric conversion device (see W. Kubo, K. Murakoshi, T. Kitamura, K. Hanabusa, H. Shirai and S. Yanagida, Chem. Lett., 1241 (1998)), or a gel electrolyte can be formed by allowing a reactive component to react after injecting the charge transfer layer (see Shuji Hayase, Mirai Zairyou (Future Materials), 13(1), 54-59 (2003).

On the other hand, a positive hole transfer material or P-type semiconductor may be used as a completely solid electrolyte in place of the redox electrolyte. Examples of the positive hole transfer material include amine derivatives and conductive polymers such as polyacetylene, polyaniline and polythiophene, and a discotic liquid crystal. Examples of the P-type semiconductor include CuI and CuSCN (see K. Tennakone, G. K. R. Senadeera, D. B. R. A. De Silva and I. R. M. Kottegoda, App. Phys. Letter).

The counter-electrode used comprises platinum, carbon, rhodium or ruthenium, which functions as a catalyst of the redox reaction of the redox electrolyte, deposited on the surface of the conductive substrate such as FTO conductive glass, or precursors of conductive fine particles applied and fired on the conductive substrate.

The dye-sensitized solar cell using the sealing agent of the invention comprises: a semiconductor electrode having a dye-sensitized semiconductor-containing layer on the surface of the conductive substrate; a counter-electrode disposed so as to face the semiconductor electrode at a specified distance; and a charge transfer layer injected into the gap between the electrodes after sealing the periphery of the semiconductor electrode and counter-electrode with the sealing agent for the photoelectric conversion device of the invention. The semiconductor electrode is formed by disposing the semiconductor-containing layer sensitized with a dye by taking the sealing portion using the sealing agent of the invention into consideration at around a first conductive substrate. A spacer such as glass fiber is added to the sealing agent for the photoelectric conversion device of the invention, and the sealing agent is applied by screen printing or using a dispenser so as to leave an injection port of the charge transfer layer at a part of the periphery of the semiconductor electrode. Then, the solvent is evaporated off by heating, for example, at 100° C. for 10 minutes, and another conductive substrate on which a platinum thin film is disposed is laminated on the first conductive substrate so that conductive faces of respective conductive substrates are in opposed relation to one another. A gap is formed by compression, and the sealing agent hardened by irradiating a UV light with a high vapor pressure mercury lamp at a luminous energy of, for example, 3,000 mJ/cm² (primary sealing). The sealing agent is further hardened by heating at 120° C. for 10 minutes. Subsequently, after injecting the charge transfer layer into the gap between both conductive substrates through the injection port, the photoelectric conversion device is obtained by sealing the injection port with the sealing agent of the invention by the same method as described above (secondary sealing). The photoelectric conversion device thus obtained is excellent in durability such as adhesive property, moisture resistance and heat resistance.

The solar cell of the invention is completed by connecting lead wires to the positive and negative electrodes of the photoelectric conversion device thus obtained, and by inserting a resistance between the electrodes.

EXAMPLES

The invention will be described in more detail with reference to examples.

Example 1

A compound having a glycidyl structure [bisphenol A epoxy resin (RE-301S, manufactured by Nippon Kayaku Co., epoxy equivalent 182 g/eq, 30 parts by weight; and Epomic R301, manufactured by Mitsui Chemical Co., epoxy equivalent 500 g/eq, 10 parts by weight)], a compound having a cyclohexene oxide structure (Celoxide 2021A, manufactured by Daicel Chemical Industries, Ltd., 30 parts by weight), a compound having an oxetane structure [BPDO (biphenyl dioxetane), manufactured by Ube Industries, Ltd., 30 parts by weight], and a silane coupling agent (epoxy silane, Saila Ace S510, manufactured by Chisso Co., 1 part by weight) were thoroughly mixed and heated at 70° C. After cooling the mixture to room temperature, 3 parts by weight of diaryliodonium salt (represented by the chemical formula 1, Rhodorsil Photoinitiator 2074, manufactured by Rhodia Chimie Co.) as a cationic polymerization initiator and 2 parts by weight of diethyl thioxanthone (represented by the chemical formula 6 below, trade name DETX-S, manufactured by Nippon Kayaku Co.) as a photosensitizer were added, and were dissolved by heating at 60° C. with stirring in the dark.

(6)

After dissolution, 1.5 parts by weight of acrylic core-shell fine particles (trade name F351, manufactured by Nippon Zeon Co.) as an adhesive force enhancing agent were added and mixed with heating at 70° C. for 1 hour. Subsequently, 20 parts by weight of synthetic silica (Crystalite 1-FF, manufactured by Tatsumori Co.) and 30 parts by weight of alumina (CR-85, manufactured by Baikowski Japan Co.) were added and mixed. After kneading in a three-roll mill, the mixture was filtered under a pressure using a 645 mesh net. The sealing agent (A) for the photoelectric conversion device of the invention with a viscosity of about 70,000 Pa·s was thus obtained. The viscosity was measured using an E-viscometer at 25° C. at a rotation speed of 5 rpm (the same hereinafter).

Example 2

The sealing agent (B) for the photoelectric conversion device of the invention having a viscosity of about 50,000 Pa·s was obtained by the same method as in Example 1, except that bisphenol A epoxy resin with an epoxy equivalent of about 250 g/eq and xylylene dioxetane (trade name XDO, manufactured by To a Gosei Co.) were used in place of RE-301S and BPDO, respectively.

Example 3

The sealing agent (C) for the photoelectric conversion device of the invention having a viscosity of about 50,000 Pa·s was obtained by the same method as in Example 1, except that a hydrogenated product of bisphenol A epoxy resin (Adeca Resin EP 4080, manufactured by Asahi Denka Co.) was used in place of Celoxide 2021A.

Example 4

The sealing agent (D) for the photoelectric conversion device of the invention having a viscosity of about 20,000 Pa·s was obtained by the same method as in Example 1, except that the inorganic filler (synthetic silica and alumina) was not used.

Example 5

The sealing agent (E) for the photoelectric conversion device of the invention having a viscosity of about 150,000 Pa·s was obtained by the same method as in Example 1, except that 40 parts by weight of bisphenol A epoxy resin with an epoxy equivalent of about 400 g/eq was used in place of 30 parts by weight of RE-301S, and Epomic R-301 was not used.

Example 6

The sealing agent (F) for the photoelectric conversion device of the invention having a viscosity of about 200,000 Pa·s was obtained by the same method as in Example 1, except that the amounts of Epomic R301 and BPDO were changed to 20 parts by weight, respectively.

Example 7

The sealing agent (G) for the photoelectric conversion device of the invention having a viscosity of about 150,000 Pa·s was obtained by the same method as in Example 1, except that 2 parts by weight of an acrylic resin (trade name Dap, manufactured by Daiso Co.) was added as a viscosity control agent.

Example 8

The sealing agent (H) for the photoelectric conversion device of the invention having a viscosity of about 70,000 Pa·s was obtained by the same method as in Example 1, except that components (a) to (c) were mixed and purified. The purification procedure was as follows: a mixed resin of the components was dissolved in toluene, and washed 5 times with pure water heated at 60° C. using a separatory funnel. After separating the toluene phase, 3% by weight of activated carbon was added to the toluene phase with stirring at 60° C. Activated carbon was removed by filtration, and the toluene phase was concentrated with heating in vacuum to purify the resin.

Example 9

The sealing agent (I) for the photoelectric conversion device of the invention having a viscosity of about 70,000 Pa·s was obtained by the same method as in Example 1, except that the iodonium salt represented by formula (2) was used as the cationic polymerization initiator in place of the iodonium salt represented by formula (1).

Example 10

The sealing agent (J) for the photoelectric conversion device of the invention having a viscosity of about 200,000 Pa·s was obtained by the same method as in Example 1, except that the sulfonium salt represented by formula (3) was used as the cationic polymerization initiator in place of the iodonium salt represented by formula (1).

Example 11

The sealing agent (K) for the photoelectric conversion device of the invention having a viscosity of about 300,000 Pa·s was obtained by the same method as in Example 1, except that BPDO was changed to PNOX (phenol novolac oxetane compound, manufactured by Showa Denko Co.), and the sulfonium salt represented by formula (4) was used as the cationic polymerization initiator in place of the iodonium salt represented by formula (1).

Example 12

The sealing agent (L) for the photoelectric conversion device of the invention having a viscosity of about 70,000 Pa·s was obtained by the same method as in Example 1, except that the amount of the iodonium salt represented by formula (1) as the cationic polymerization initiator was increased from 3 parts by weight to 7 parts by weight, and the photosensitizer represented by formula (7) below was used in place of the photosensitizer DETX-S represented by formula (6).

(7)

Example 13

The sealing agent (M) for the photoelectric conversion device of the invention was obtained by blending 100 parts by weight of a thermoplastic elastomer-containing epoxy resin (X-4801 (bisphenol A epoxy resin containing 20% by weight of Toughtec M20), manufactured by Asahi Kasei Co.) as a compound having a glycidyl structure, 0.5 part by weight of a sulfonium salt represented by formula (5) as a cationic polymerization initiator, and 5 parts by weight of an epoxy silane coupling agent (A-187, manufactured by Nippon Unicar Co.), and mixing and dispersing the mixture with a three-roll kneader.

Example 14

The sealing agent (N) for the photoelectric conversion device of the invention was obtained by the same method as in Example 13, except that 20 parts by weight of a thermoplastic elastomer-containing epoxy resin (X-4801 (bisphenol A epoxy resin containing 20% by weight of Toughtec M20), manufactured by Asahi Kasei Co.) and 80 parts by weight of bisphenol A epoxy resin (EP828, manufactured by Shell Co.) as a compound having a glycidyl structure, were used. The viscosity of the sealing agent (N) for the photoelectric conversion device was measured at 25° C. It was confirmed that the sealing agent had a viscosity of 50,000 cps at 20 rpm, which is suitable for screen printing.

Example 15

The sealing agent (O) for the photoelectric conversion device of the invention was obtained by the same method as in Example 1, except that a composition prepared by adding 20 parts by weight of ethyleneglycol divinyl ether (manufactured by BASF Co.) as a compound having a vinyl ether structure was added to the composition in Example 1. The viscosity of the sealing agent (O) for the photoelectric conversion device was measured at 25° C., and the sealing agent was confirmed to have a viscosity of 40,000 cps at 20 rpm, which is suitable for screen printing.

Test Example 1

Glass fiber (1% by weight) with a diameter of 5 μm was added as a spacer to the sealing agent (A) obtained in Example 1. A glass chip with a size of 1.5 mm square was bonded on a glass substrate, and UV light with a luminous energy of 3,000 mJ/cm² was irradiated to the substrate. Glass-glass bonding shear strength was measured by applying a horizontal load to the test piece (P) obtained using a bond tester (manufactured by Seishin Trading Co.). A value of the maximum breaking load divided by the area of the chip was defined to be an ordinary bonding strength. The result is shown in Table 1.

Test Example 2

The ordinary bonding strength was measured by the same method as in Test Example 1 with respect to a test piece (O) obtained by the same method as in Test Example 1 by using the sealing agent (M) prepared in Example 13. The result is shown in Table 1.

Test Example 3

The ordinary bonding strength was measured by the same method as in Test Example 1 with respect to a test piece (R) obtained by the same method as in Test Example 1 by using the sealing agent (N) prepared in Example 14. The result is shown in Table 1.

Test Example 4

Glass fiber (1% by weight) with a diameter of 5 μm was added as a spacer to the sealing agent (A) obtained in Example 1. A glass chip with a size of 1.5 mm square was bonded on a glass substrate, and UV light with a luminous energy of 3,000 mJ/cm² was irradiated to the substrate, followed by heating at 85° C. for 30 minutes for post-hardening.

An ordinary bonding strength was measured by the same method as in Test Example 1 with respect to the test piece (S) obtained. The result is shown in Table 1.

Test Example 5

The test piece (P) obtained by the same method as in Test Example 1 was allowed to stand at 121° C. for 20 hours under a pressure using a pressure cooker, and moisture resistant bonding strength was measured by the same method as in Test Example 1. The result is shown in Table 1.

Test Example 6

The moisture resistant bonding strength was measured by the same method as in Test Example 5 with respect to the test piece (P) obtained by the same method as in Test Example 2. The result is shown in Table 1.

Test Example 7

An ordinary bonding strength of ITO-ITO was measured by the same method as in Test Example 1, except that the glass substrate and glass chip in Test Example 1 were changed to ITO (indium tin oxide) and ITO chip, respectively. The result is shown in Table 1.

Test Example 8

An ordinary bonding strength of Chromium-ITO was measured by the same method as in Test Example 1, except that the glass substrate and glass chip in Test Example 1 were changed to a chromium substrate and ITO chip, respectively. The result is shown in Table 1.

Test Example 9

The sealing agent (A) obtained in Example 1 was applied on a glass substrate on which a PET film was bonded, and the sealing agent was extended to a thickness of about 0.1 mm. Then, the sealing agent was irradiated with UV light with a luminous energy of 3,000 mJ/cm$^2$ followed by heating at 90° C. for 30 minutes to obtain a hardened film. The film was cut into a prescribed size, and elastic modulus of the film was measured at a heating rate of 2° C./min using a thermomechanical analyzer (trade name TMA, manufactured by Rigaku Co.). An expansion coefficient ($\alpha$1) was determined from the gradient, and a glass transition temperature was determined from the inflection point of the elastic modulus curve. The result is shown in Table 2.

Test Example 10

The cured film obtained in Test Example 9 was immersed in boiling water for 5 hours, and water absorption coefficient (%) was determined from the following equation. The result is shown in Table 2.

Water absorption coefficient=[(weight after water absorption−weight before water absorption)/(weight before water absorption)]×100

TABLE 1

| Test Example | Ordinary Bonding Strength (MPa) | Moisture Resistant Bonding Strength (MPa) |
|---|---|---|
| 1 | 35 | — |
| 2 | 57 | — |
| 3 | 51 | — |
| 4 | 67 | — |
| 5 | — | 31 |
| 6 | — | 48 |
| 7 | 40 | — |
| 8 | 24 | — |

TABLE 2

| Test Example | Expansion Coefficient | Glass Transition Temperature (° C.) | Water Absorption Coefficient (%) |
|---|---|---|---|
| 9 | 2.2 × 10$^{-5}$ | 131 | — |
| 10 | — | — | 1.2 |

Test Example 11

Corrosion Test of ITO Electrode

Figure 2:
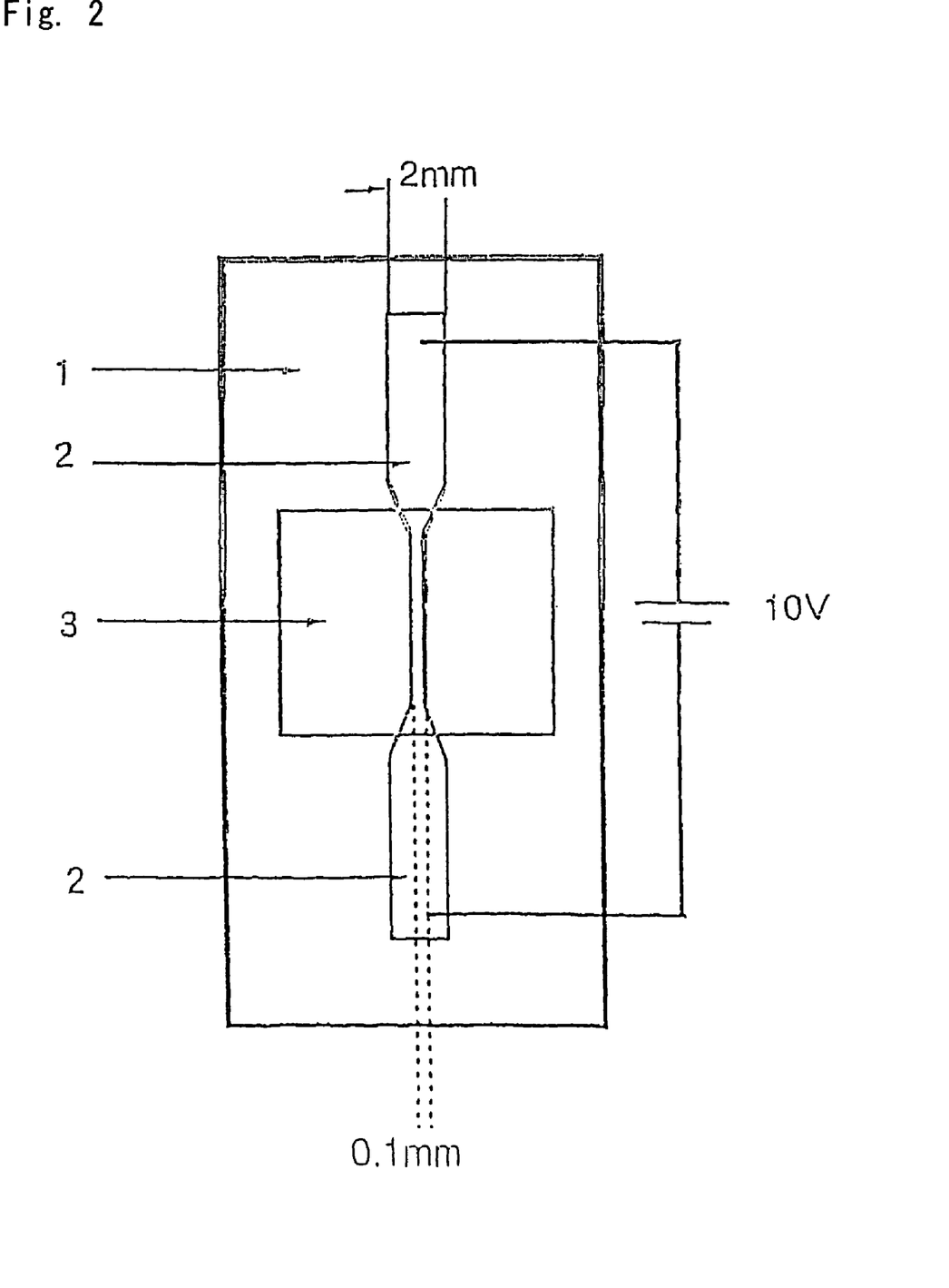
FIG. 2 is a explanation drawing of a corrosion test of an ITO electrode, wherein the reference numeral 1 denotes a glass substrate, the reference numeral 2 denotes an ITO electrode, and the reference numeral 3 denotes a sealing agent.

A pattern glass was prepared by forming an ITO electrode film 2 (terminal width of ITO electrode 2 mm, gap at the tip 0.1 mm) on a glass substrate 1 as shown in FIG. 2. The sealing agent (M) obtained in Example 13 was applied on the insulated portion of the pattern glass, and the sealing agent was hardened by irradiating UV light by the same irradiation condition as in Test Example 1. The pattern glass was allowed to stand for 20 days in a constant temperature bath at 65° C. and 90% RH while a direct current voltage of 5 V was applied on the ITO electrode film. The ITO electrode film at the portion where the adhesive was applied was observed under a microscope. It was confirmed from the result that the sealing agent for the photoelectric conversion device of the invention does not corrode the ITO electrode film.

Example 16

Figure 1:
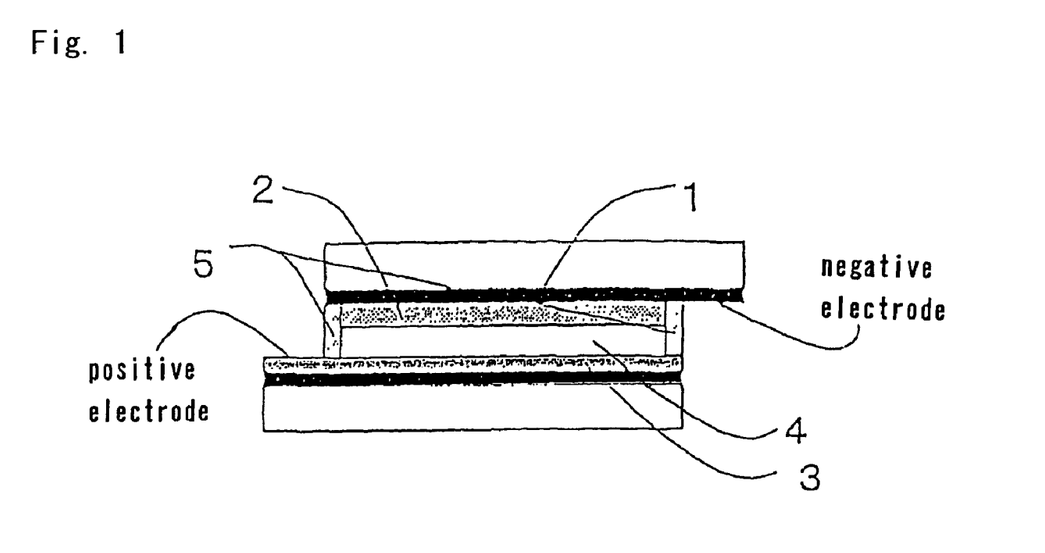

A paste of TiO$_2$ fine particles (P25, manufactured by Degussa Co.) as a semiconductor-containing layer was applied on the conductive surface of a FTO conductive glass substrate as a conductive substrate of a dye-sensitized solar cell as shown in an example of the photoelectric conversion device in FIG. 1. After firing the substrate at 450° C. for 30 minutes, it was immersed in an ethanol solution of a dye (3×10$^{-4}$ M) represented by the following formula (8) for 24 hours to produce a semiconductor electrode. Subsequently, Pt was deposited on the conductive surface of another FTO conductive glass substrate to prepare a counter-electrode 3.

(8)

(9)

Subsequently, the sealing agent (A) 5 prepared in Example 1 was applied at the periphery of the counter-electrode 3 with a dispenser so as to leave an injection port for the charge transfer layer 4. After allowing the solvent to evaporate by heating at 100° C. for 10 minutes, the semiconductor electrodes 1 and 3 were laminated. After the lamination, a gap was formed by compression, and both electrodes were bonded together by hardening the sealing agent by irradiating UV light with a luminous energy of 3,000 mJ/cm$^2$.

Then, an iodine charge transfer layer 4a [iodine, lithium iodide, methylhexyl imidazolium iodide (manufactured by Shikoku Kasei Co.) and t-butylpyridine were adjusted to a concentration of 0.1 M, 0.1 M, 0.6 M and 1 M, respectively, with 3-methoxy propionitrile] was injected into the cell through the injection port of the charge transfer layer on the bonded electrodes. The injection port was sealed with the sealing agent of the invention, and the photoelectric conversion device (1) was obtained by hardening the sealing agent by irradiating UV light.

Example 17

The photoelectric conversion device (2) was obtained by the same method as in Example 15, except that the sealing agent (I) for the photoelectric conversion device in Example 9 was used in Example 16, and the semiconductor-containing layer was prepared by hydrolyzing titanium alkoxide by a sol-gel method according to C. J. Barbe, F. Arendse, P. Compt and M. Graetzel, J. Am. Ceram. Soc., 80, 12, 3157-71 (1997).

Example 18

The photoelectric conversion device (3) was obtained by the same method as in Example 16, except that the sealing agent (J) for the photoelectric conversion device in Example 10 was used in Example 17, the dye represented by the following formula (9) was used in place of the dye represented by the chemical formula (8), 20 mM of chenodeoxycholic acid was used, and iodine and tetra-n-propylammonium iodide were adjusted to concentrations of 0.05 M and 0.5 M, respectively, with ethylene carbonate/acetonitrile (6/4) as the charge transfer layer (4b)

Example 19

The photoelectric conversion device (4) was obtained by the same method as in Example 16, except that the sealing agent (L) for the photoelectric conversion device in Example 12 was used in Example 17.

Example 20

The photoelectric conversion device (5) was obtained by the same method as in Example 16, except that the sealing agent (M) for the photoelectric conversion device in Example 13 was used in Example 17, and a 1:1 mixture of the dye represented by the formula (8) and a dye represented by the formula (10) below was used in place of the photosensitizing dye represented by the formula (8).

(10)

Example 21

The photoelectric conversion device (6) was obtained by the same method as in Example 19, except that the sealing agent (O) for the photoelectric conversion device in Example 15 was used in Example 20.

Measurement of Photoelectric Conversion Efficiency

The solar cell of the invention was obtained by connecting lead wires to the electrodes of each photoelectric conversion device obtained, and an ammeter and a voltmeter were disposed to the solar cell. The photoelectric conversion efficiency of each solar cell was measured as follows. The size of the effective area of the photoelectric conversion device to be measured was 0.5×0.5 cm$^2$. A xenon lamp (1 kW, manufactured by Ushio Inc.) was used as a light source, and the output energy was made 100 mW/cm$^2$ after passing through an AM1.5 filter. Short circuit current, release current, conversion efficiency and shape factor were measured using a potentiogalvanostat (manufactured by Hokuto Denko Co.). The results are shown in Table 3.

TABLE 3

|  | Short Circuit Current (mA/cm$^2$) | Release Voltage (V) | Photoelectric Conversion Efficiency (%) | Shape Factor |
| --- | --- | --- | --- | --- |
| Example 16 | 12.0 | 0.70 | 5.3 | 0.63 |
| Example 17 | 17.0 | 0.75 | 8.0 | 0.63 |
| Example 18 | 14.6 | 0.72 | 6.5 | 0.62 |
| Example 19 | 17.0 | 0.75 | 8.0 | 0.63 |
| Example 20 | 17.5 | 0.75 | 8.7 | 0.66 |
| Example 21 | 17.0 | 0.73 | 8.5 | 0.68 |
| Example 22 | 12.2 | 0.70 | 5.3 | 0.62 |

Gap-Forming Test by Bonding Conductive Substrates

To 100 g of the sealing agent for the photoelectric conversion device obtained, 1 g of glass fibers with a diameter of 10 μm as spacers are mixed with stirring. This sealing agent for the photoelectric conversion device is applied on a conductive substrate (FTO glass substrate) with a size of 50 mm×50 mm using a dispenser. After allowing the solvent to evaporate by heating at 100° C. for 10 minutes on a hot-plate, another conductive substrate having the same size as the substrate prepared above is laminated on the former conductive substrate at 25° C. under a load. Then, the state of the sealing agent for the photoelectric conversion device is confirmed whether it is compressed (elongated) to permit the upper and lower conductive substrates to come into close contact to one another (lamination test of the conductive substrates). Then, the laminated conductive substrates having the sealing agent that has been compressed with a load is clipped, and UV light is irradiated to the substrates at a luminous energy of 3,000 mJ/cm$^2$, and the state of the sealing agent for the photoelectric conversion device between the substrates is confirmed whether it has been compressed to a thickness of 10 μm, or to the thickness as a spacer (gap-forming test of the conductive substrate). The results are shown in Table 4.

Moisture Resistant Bonding Strength Test

To 100 g of the sealing agent for the photoelectric conversion device obtained, 1 g of glass fibers with a diameter of 10 μm are mixed with stirring as spacers. This sealing agent for the photoelectric conversion device is applied on a conductive substrate (FTO glass substrate) with a size of 50 mm×50 mm using a dispenser. The solvent is removed by allowing it to evaporate by heating on a hot-plate, and a glass plate with a size of 2 mm×2 mm is bonded on the sealing agent for the photoelectric conversion device. After hardening the sealing agent by irradiating UV light with a luminous energy of 3,000 mJ/cm$^2$ from a high vapor pressure mercury lamp, the bonded substrate was subjected to a pressure cooker test at 121° C., 2 atm, and 100% RH to measure shear adhesive strength. The results are shown in Table 2.

|  | Example | | | | | |
| --- | --- | --- | --- | --- | --- | --- |
|  | 16 | 17 | 18 | 19 | 20 | 21 |
| Lamination of Conductive Substrate | ○ | ○ | ○ | ○ | ○ | ○ |
| Gap Formation between Substrates | ○ | ○ | ○ | ○ | ○ | ○ |

-continued

|  | Example | | | | | |
| --- | --- | --- | --- | --- | --- | --- |
|  | 16 | 17 | 18 | 19 | 20 | 21 |
| Bonding Shear Strength after Humidity Resistance Test (MPa) | 35 | 40 | 43 | 52 | 60 | 51 |

○: Good bonding
Δ: Gap formation by heating is possible since the sealing agent for the photoelectric conversion device melts by heating, although bonding of the conductive substrates is impossible at ambient temperature.
X: Poor bonding The magnitude of short circuit current decreases when impurities are mingled into the charge transfer layer to consequently reduce photoelectric conversion efficiency. As is evident from the photoelectric conversion efficiency in Table 3, the magnitude in each example is large. Therefore, it is shown that contaminants are seldom flows into the charge transfer layer from the sealing agent in the examples. Table 4 shows that bonding between the upper and lower conductive substrates is possible at ambient temperature in the production process of the photoelectric conversion device while the sealing agent has sufficient adhesive strength and reliable moisture resistance durable to multiple patterning. In addition, the sealing agent is excellent in flexibility while hardening is completed within a short period of time to enable a desired gap to be formed.

Example 22

The photoelectric conversion device (7) was obtained by the same method as in Example 16, except that the device was sealed at 110° C. within 5 minutes (primary sealing) using Hymirane (trade name, thermoplastic film with a thickness of 50 μm, manufactured by Mitsui Dupont Co.) as a sealing agent. The results of evaluation of the photoelectric conversion device (7) obtained are shown in Table 3.

INDUSTRIAL APPLICABILITY

The sealing agent for the photoelectric conversion device of the invention is hardened with a low luminous energy of about 3,000 mJ/cm$^2$ in a short period of time to enable high adhesive strength to be manifested. The photoelectric conversion device suffers low load by post-heating at a relatively low temperature for a short period of time. Consequently, productivity can be markedly improved. The sealing agent of the invention has a long spot life, excellent workability, high printability and does not corrode the ITO electrode. The sealing agent of the invention also has quite good properties inherently required such as adhesivity, heat resistance and water absorption coefficient as well as moisture resistant strength. Therefore, the sealing agent for the photoelectric conversion device of the invention is quite useful for producing a photoelectric conversion device having high reliability for a long period of time.

The invention claimed is:
1. A sealing agent for a dye-sensitized photoelectric conversion device comprising: a cationic polymerization initiator;
   one or more compounds selected from the group consisting of a glycidyl, cyclohexene oxide, an oxetane, and a vinyl ether; and
   a thermoplastic elastomer in an amount of not less than 3.7% by weight and less than 20% by weight.

2. A sealing agent for a dye-sensitized photoelectric conversion device comprising: a cationic polymerization initiator;
   at least two compounds selected from the group consisting of a glycidyl, cyclohexene oxide, an oxetane, and a vinyl ether; and
   a thermoplastic elastomer in an amount of not less than 3.7% by weight and less than 20% by weight.

3. The sealing agent for a dye-sensitized photoelectric conversion device according to claim 1 or 2, wherein the compound having a glycidyl structure is a bisphenol type epoxy resin.

4. The sealing agent for a dye-sensitized photoelectric conversion device according to claim 3, wherein the bisphenol type epoxy resin is a bisphenol A type epoxy resin.

5. The sealing agent for a dye-sensitized photoelectric conversion device according to any one of claim 1 or 2, further containing a coupling agent.

6. The sealing agent for a dye-sensitized photoelectric conversion device according to claim 5, wherein the coupling agent is a silane coupling agent.

7. The sealing agent for a dye-sensitized photoelectric conversion device according to any one of claim 1 or 2, further containing an inorganic filler.

8. The sealing agent for a dye-sensitized photoelectric conversion device according to claim 7, wherein the inorganic filler is alumina and/or silica.

9. The sealing agent for a dye-sensitized photoelectric conversion device according to any one of claim 1 or 2, wherein the cationic polymerization initiator is a diaryliodinium salt and/or a triarylsulfonium salt.

10. A dye-sensitized photoelectric conversion device sealed with a sealing agent comprising:
    a cationic polymerization initiator;
    one or more compounds selected from the group consisting of a glycidyl, a cyclohexene oxide, an oxetane and a vinyl ether; and
    a thermoplastic elastomer in an amount of not less than 3.7% by weight and less than 20% by weight based on the sealing agent.

11. A dye-sensitized photoelectric conversion device sealed with a sealing agent comprising: a cationic polymerization initiator;
    at least two compounds selected from the group consisting of a glycidyl, a cyclohexene oxide, an oxetane, and a vinyl ether; and
    a thermoplastic elastomer in an amount of not less than 3.7% and less than 20% by weight based on the sealing agent.

12. A production method for a dye-sensitized photoelectric conversion device comprising the steps of:
    disposing a conducive substrate having a semiconductor-containing layer and a conductive substrate having a counter-electrode so as to face to one another at a specified distance;
    fixing the substrates with a sealing agent interposed at the periphery of the substrates; said sealing agent comprising a cationic polymerization initiator and at least two compounds selected from the group consisting of a glycidyl, a cyclohexene oxide, an oxetane and a vinyl ether; and a thermoplastic elastomer in an amount of not less than 3.7% by weight and less than 20% by weight based on the sealing agent; and
    inserting a charge transfer layer in a gap between the substrates to obtain a dye-sensitized photoelectric conversion device.

13. A production method for a dye-sensitized photoelectric conversion device comprising the steps of:
    disposing a conductive substrate having a semiconductor-containing layer and a conductive substrate having a counter-electrode so as to face to one another at specified distance;
    fixing the periphery of the substrates with a sealing agent, except for an injection port for injecting a charge transfer layer, said sealing agent comprising a cationic polymerization initiator and one or more compounds selected from the group consisting of a glycidyl, a cyclohexene oxide, an oxetane and a vinyl ether and a thermoplastic elastomer in an amount of not less than 3.7% by weight and less than 20% by weight based on the sealing agent;
    injecting the charge transfer layer through the injection port; and
    sealing the injection port with the sealing agent for the dye-sensitized photoelectric conversion device of the invention.

14. A solar cell comprising a dye-sensitized photoelectric conversion device and wherein the photoelectric conversion device is according to claim 10 or 11.

15. A production method for a dye-sensitized photoelectric conversion device comprising the steps of:
    disposing a conducive substrate having a semiconductor-containing layer and a conductive substrate having a counter-electrode so as to face to one another at a specified distance;
    fixing the substrates with a sealing agent interposed at the periphery of the substrates; said sealing agent comprising a cationic polymerization initiator;
    at least two compounds selected from the group consisting of a glycidyl, a cyclohexene oxide, an oxetane, and a vinyl ether; and a thermoplastic elastomer in an amount of not less than 3.7% by weight and less than 20% by weight based on the sealing agent; and
    inserting a charge transfer layer in a gap between the substrates to obtain a dye-sensitized photoelectric conversion device.

* * * * *